United States Patent [19]
Battles et al.

[11] 3,915,742
[45] Oct. 28, 1975

[54] INTERELECTRODE SEPARATOR FOR ELECTROCHEMICAL CELL

[75] Inventors: James E. Battles, Oak Forest; Franklin C. Mrazek, Hickory Hills, both of Ill.

[73] Assignee: The United States of America as represented by the United States Energy Research & Development Administration, Washington, D.C.

[22] Filed: May 7, 1974

[21] Appl. No.: 467,683

[52] U.S. Cl............ 136/6 LF; 136/100 R; 136/147
[51] Int. Cl.²................... H01M 43/00; H01M 3/00
[58] Field of Search......... 136/6 FS, 6 F, 6 R, 6 SA, 136/6 LF, 20, 147, 83 R, 100 R, 145, 146; 106/55; 423/290; 161/170; 162/152, 157 R, 181 A, 181 R

[56] References Cited
UNITED STATES PATENTS

| | | | |
|---|---|---|---|
| 3,429,722 | 2/1969 | Economy et al. | 106/55 |
| 3,488,221 | 1/1970 | Shimotake et al. | 136/6 FS X |
| 3,510,359 | 5/1970 | Selover, Jr. et al. | 136/146 |
| 3,639,174 | 2/1972 | Kegelman | 136/20 |
| 3,666,560 | 5/1972 | Cairns et al. | 136/20 X |
| 3,668,059 | 6/1972 | Economy et al. | 161/170 |
| 3,791,867 | 2/1974 | Broadhead et al. | 136/6 R |
| 3,816,242 | 6/1974 | Selover et al. | 162/157 R |

*Primary Examiner*—Anthony Skapars
*Attorney, Agent, or Firm*—Dean E. Carlson; Arthur A. Churm; Hugh W. Glenn

[57] ABSTRACT

A high-temperature electrochemical cell includes an anode containing an alkali metal, a cathode containing a chalcogen, and an electrically insulative separator wetted with electrolyte, between the electrodes. The separator is a porous layer of boron nitride processed to be substantially free of $B_2O_3$. This purification prevents the formation of an electrically conductive layer resulting from reactions involving boron oxide.

2 Claims, 2 Drawing Figures

INTERELECTRODE SEPARATOR FOR ELECTROCHEMICAL CELL

CONTRACTUAL ORIGIN OF THE INVENTION

The invention described herein was made in the course of, or under, a contract with the United States Atomic Energy Commission.

BACKGROUND OF THE INVENTION

This invention relates to an improved interelectrode separator for use within a high-temperature electrochemical cell. In particular, it relates to an improved form of boron nitride for use in cells including alkali metals with high reductive potential. Electrochemical cells of these types can be assembled into batteries for use in powering electric automobiles or for the storage of electric energy that can be generated during intervals of off-peak power consumption within an electrical distribution network. A single cell or a battery comprising a few small cells can have application as an implantable power source for an artificial heart or a heart assist device.

In the construction of electrochemical cells it is required that electrodes of opposite polarity be disposed so as not to touch or to permit electronic conductivity between the electrodes. Many prior electrochemical cells have included spaced-apart electrodes with a layer or a level of the electrolyte disposed in between to permit ionic conductivity and current flow in the cell. Such a configuration is illustrated in U.S. Pat. No. 3,716,409 to Cairns et al. and assigned to the assignee of the present application. A more compact cell design is illustrated in FIG. 1 of U.S. patent application Ser. No. 416,311, entitled "Modular Electrochemical Cell," filed Nov. 15, 1973, to Walsh et al., also assigned to the assignee of the present application.

In a compact cell design, it is necessary to interpose electrically insulative or dielectric material between the anode and cathode. The material must have adequate electrical properties to prevent or severely restrict electronic conductivity between the electrodes. In addition, the material must be wetted by the electrolyte and be sufficiently permeable to permit ionic conductivity of electrolyte species between the two electrodes. Various materials including boron nitride, yttria, zirconia, calcium zirconate and certain other ceramic materials are thought to be generally suitable for use in the fabrication of an interelectrode separator having these properties. Boron nitride has appeared among the more promising of these materials for this purpose.

Boron nitride is not only a good electrical insulator, but it is chemically resistant to reactants and electrolytes such as lithium, lithium-aluminum alloy, sulfur and lithium salts used in high-temperature electrochemical cells. However, it has been found that commercially available boron nitride ordinarily will have a boron oxide concentration of between 2 and 6% by weight. Even high-purity nitride can become contaminated when exposed to air and moisture and will ordinarily have at least 2 w/o of oxide contaminants. On exposure to lithium or lithium-aluminum alloy at high temperatures of 350° to 400°C., the lithium will react with the boron oxides, possibly to form elemental boron, and produce a conductive layer on the boron nitride material. Other alkali metals such as sodium of high reductive potential would most likely also result in a similar reaction. Sometimes this exposure to reactive metals at high temperatures will also cause the separator material to disintegrate. The inventors have found that boron nitride cloth made of commercially available yarn and having a $B_2O_3$ concentration of about 2 w/o disintegrates on exposure to molten lithium metal at 400°C. for 300 hours. Either the disintegration of the separator material or the deposition of a conductive film will eventually produce a path of electronic conduction between the electrodes, causing a diminution or failure in power output.

In order to overcome these problems, the inventors have developed an improved interelectrode separator for use within a compact electrochemical cell. The separator material is a layer of boron nitride substantially free of boron oxides and elemental boron. Various other modifications are disclosed and claimed hereinafter for meeting problems that arise in respect to particular electrochemical cell combinations.

SUMMARY OF THE INVENTION

It is an object of the present invention to provide an improved high-temperature electrochemical cell with an electronically insulating, interelectrode separator disposed between closely positioned electrodes.

It is also an object to provide such an improved cell with an interelectrode separator that is free of constituents that can be chemically converted into an electronic conducting material.

In accordance with the present invention, a high-temperature, secondary electrochemical cell is presented which includes an alkali metal reactant in the anode, a chalcogen reactant in the cathode and an electrolyte containing said alkali metal. Interposed between the anode and cathode is a porous layer of boron nitride substantially free of elemental boron and boron oxides.

BRIEF DESCRIPTION OF THE DRAWINGS

The present invention is illustrated in the accompanying drawings wherein.

DETAILED DESCRIPTION OF THE PREFERRED EMBODIMENT

Figure 1:
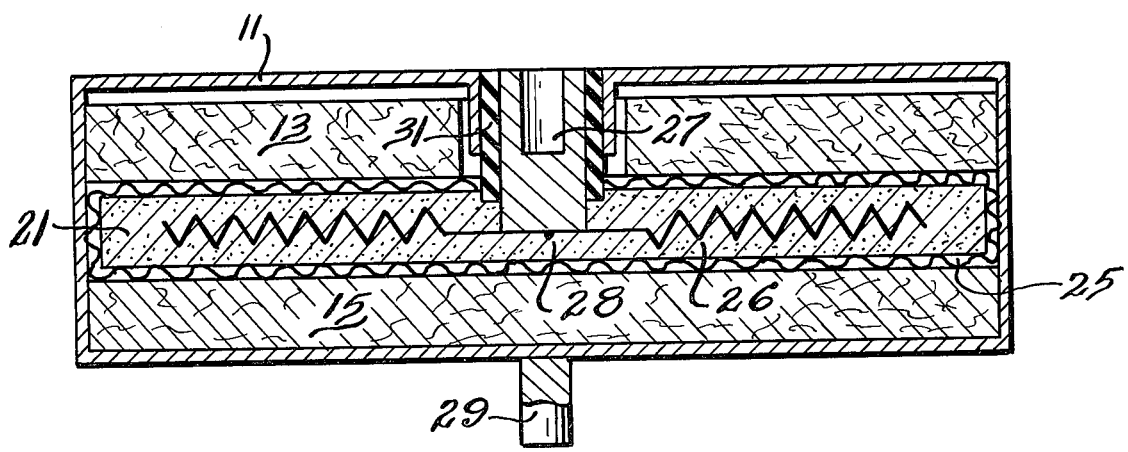
FIG. 1 is an elevation view in cross section of a compact electrochemical cell including an interelectrode separator.

FIG. 1 shows a compact or modular electrochemical cell with two anodes 13 and 15 disposed on either side of a single cathode 21. For instance, at the cell operating temperature, the anodes can be a porous solid of lithium-aluminum or other solid alloy, or a solid substrate such as porous steel impregnated with molten lithium or molten lithium alloy. The cathode can be a paste of molten sulfur with carbon black or a mixture of a solid sulfur compound such as $FeS_2$ with a powdered current collector material. The electrodes are contained within an electrically conductive housing 11 having axially disposed plug-in socket terminals 27 and 29 to permit stacking of a plurality of electrochemical cells. The preparation of suitable electrodes and the assembly of the cell is fully described in U.S. application Ser. No. 416,311 cited above. This prior application is expressly incorporated by reference at this point to illustrate one type of cell that can beneficially employ the present invention.

An interelectrode separator material 25 is shown essentially enclosing, that is almost completely enclosing cathode 21 except for a central opening at the top surface to permit penetration of terminal 27 and ceramic insulator 31. Terminal 27 is connected to current grid 26 within the cathode at point 28. The fabric can be layered over the top and bottom surfaces of the cathode in two pieces and the pieces sewed together at the edges to form a pouch. The cathode, thus enclosed, can be readily assembled into the cell contiguous to the two anodes 13 and 15. Extremely close interelectrode clearances, of a few millimeters, can be employed with this configuration, thus decreasing cell resistance.

In one manner of fabricating the interelectrode separator material, fibers of boron nitride are spun into a yarn of about 30 to 60 mil diameter. The yarn is tightly woven into a fabric having a square, satin or twill weave. The interstitial area between the yarn should comprise no more than 20% of the fabric area. As an example, a fabric having at least 16 strands of 30 mil yarn per linear inch of both warp and of weft has been found to be suitable for this purpose. Other types of separator material that might also be used include knitted boron nitride fabrics, sheets of boron nitride paper having a suitable distribution of small openings or a boron nitride felt of the desired porosity, e.g. about 90% void by volume.

Prior to employing the separator material within an electrochemical cell, the boron nitride fabric is treated in order to remove impurities. Oxides of boron, particularly $B_2O_3$, are thought to be the most detrimental impurity within the material. Such oxides, when contacted with the alkali metal within the anodes, for instance, lithium, are reduced to form elemental boron. If the oxides are on the surface of the fabric, an electrically conductive film of boron metal can be formed, possibly resulting in a path for electronic conduction between the electrodes. Should deeply embedded oxides be reduced, a complete breakdown and disintegration of the fabric can result.

In treating the boron nitride fabric, appropriately sized pieces of this material are hung from racks or laid on a metal surface within a chamber having ports for admitting and discharging a flow of nitrogen gas. Dry nitrogen gas is then passed through the chamber (1,600° to 1,800°C.) in contact with the fabric for a period of time between 2 and 4 hours. The nitrogen gas atmosphere prevents decomposition of the boron nitride which would otherwise occur at these temperatures.

Figure 2:
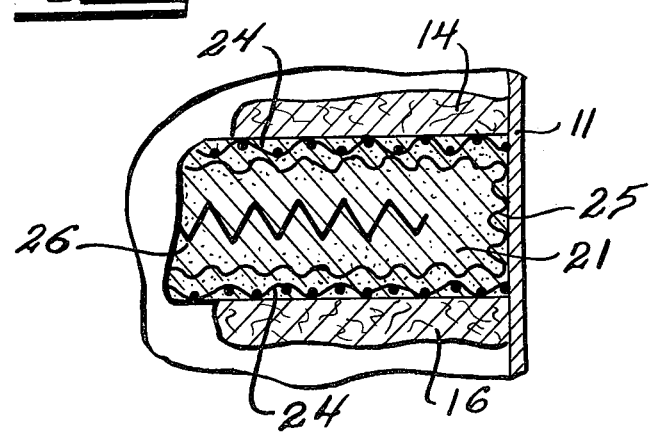
FIG. 2 is an enlarged fragmentary view of a modification to the interelectrode separator in the cell of FIG. 1.

Referring now to FIG. 2 where a portion of an electrochemical cell with a slightly modified interelectrode separator is shown. This separator would be particularly useful in electrochemical cells employing molten lithium or molten lithium alloy impregnated into metallic matrices of such as stainless steel fibers illustrated at 14 and 16. Cathode 21 is interdisposed between anodes 14 and 16 and is enclosed within a boron nitride fabric 25. Fabric 25 is treated for removal of oxide in the manner described above. In addition to cloth 25, electrically insulative screens 24 are sized to cover the complete upper and lower surfaces of cathode 21 and interposed between the boron nitride fabric and the two anodes 14 and 16. The screens are made of a material selected to resist the high temperatures and corrosive environment within the electrochemical cell. One material suitable for this application is a molybdenum metal mesh which is coated with calcium zirconate to provide an outer, electrically insulative layer. The calcium zirconate is plasmaspray deposited onto the molybdenum metal at temperatures near the melting point of $CaZrO_3$ to insure a good bond between the ceramic and the metal. The deposition can be performed with a commercially available system that can provide a plasma by the ionization of, for example, argon gas within a high-voltage gap.

When employing molten lithium metal or molten alloy as the anode reactant, it has been found that the molten metal will often wet a boron nitride fabric and, in some instances, result in a metallic path for electronic conduction between the anode and cathode. When the coated screens 24 are interposed between the boron nitride fabric and the anode structures, the possibility of anode reactant entering the separator fabric is greatly reduced. In this respect the interelectrode separator configuration shown in FIG. 2 is seen to be a preferred embodiment in electrochemical cells employing a molten reactant as opposed to a solid alloy in the anode.

EXAMPLE I

A sample of about 6 $cm^2$ of boron nitride cloth woven from 30 mils boron nitride yarn was found to contain about 2.2 w/o $B_2O_3$ before treatment. The cloth was exposed to dry flowing nitrogen gas at 1,650°C. for a period of 2.5 hours. After this treatment, the cloth was found to have a $B_2O_3$ concentration of 0.4 w/o. Other tests conducted on similar cloth for 4 hours at 1,750°C. showed a $B_2O_3$ reduction from 2.2 w/o to 0.3–0.5 w/o. Cloth having 0.4 w/o $B_2O_3$ was submerged in molten lithium for 600 hours at 400°C. On inspection following the test, the cloth was found to be of good integrity and nonconductive.

Boron nitride cloth purified in the above manner and having a $B_2O_3$ concentration of <0.5 w/o was assembled as an interelectrode separator within an electrochemical cell as illustrated and described in conjunction with FIG. 1. The separator fabric was about 1.5 mm thick and of sufficient area to enclose a 12 cm diameter cathode. A molten LiCl–KCl salt was included as electrolyte for wetting the separator and providing ionic conduction between the electrodes. The cell included two anodes of solid lithium-aluminum alloy disposed on either side of a cathode formed of $FeS_2$ with an expanded mesh of molybdenum serving as a current collector. The cell operated for over 1,390 hours and b 41 charge and recharge cycles. During this interval, no electrical shorting between the anode and cathode was noted that could be attributed to the breakdown of the interelectrode separator.

EXAMPLE II

An experimental cell including a single anode of porous stainless steel matrix impregnated with molten lithium - 25 w/o copper solution was tested with a slightly modified interelectrode separator. The anode was covered with a 40 mesh molybdenum screen of 5 mil wire which was plasma-spray coated with about 5 mil of calcium zirconate to produce an over-all thickness of about ½ mm. The cathode was enclosed in a pouch of 1½ mm thick boron nitride cloth purified in essentially the same manner as the separator of Example I. The cathode was originally spaced about 9 mm from the anode to allow for expansion. After operating the cell for over 520 hours and 105 cycles, it was found that the cathode had expanded sufficiently to bring the boron nitride cloth into contact with the plasma-coated screen. However, no evidence of electrical shorting attributable to lithium wicking through the boron nitride cloth was observed. Since the cathode expansion normally occurs early during the cell life, it is reasonable to conclude that the operation of this cell simulated the operation of a cell having an interelectrode separator as illustrated in FIG. 2 and that such a separator is of value in retaining molten lithium or molten lithium with a dissolved additive within the anode.

It can be seen from the above that the present invention provides an improved electrochemical cell for use with close interelectrode clearances at high temperatures. The close clearances are made possible through use of an interelectrode separator of boron nitride substantially free of oxide impurities. Thus, deterioration and reduction to an electrically conductive form within the separator material are avoided, resulting in improved cell life and performance.

The embodiments of the invention in which an exclusive property or privilege is claimed are defined as follows:

1. In a secondary electrochemical cell having a cathode disposed between two anodes, said cell including molten lithium reactant in said anodes, a chalcogen reactant in said cathode, an electrolyte containing lithium ions and a porous interelectrode separator disposed to essentially enclose said cathode, the improvement wherein said separator comprises a porous fabric of boron nitride substantially free of elemental boron and having less than 0.5% by weight $B_2O_3$, said fabric being tightly woven of 30 to 60 mil diameter yarn with interstitial openings not exceeding 20% of the fabric area, said separator also including layers of electrically insulative mesh interposed between said boron nitride fabric and said anodes to prevent wicking of said molten lithium into said boron nitride fabric.

2. The electrochemical cell of claim 1 wherein said electrically insulative mesh comprises molybdenum metal with an outer coating of plasma-deposited calcium zirconate.

* * * * *